United States Patent [19]

Rutledge

[11] Patent Number: 4,787,661
[45] Date of Patent: Nov. 29, 1988

[54] ADJUSTABLE DOUBLE HANDLED SHOVEL

[75] Inventor: Thomas G. Rutledge, Chicago, Ill.

[73] Assignee: Work Made Easy, Inc., Chicago, Ill.

[21] Appl. No.: 56,380

[22] Filed: Jun. 1, 1987

[51] Int. Cl.⁴ .......................... A01B 1/22; B25G 1/04
[52] U.S. Cl. ......................................... 294/58; 294/49
[58] Field of Search .................... 294/58, 49, 57, 59,
294/54.5; 37/265; 15/143 R, 144 R, 145;
16/114 R; 254/131.5

[56] References Cited

U.S. PATENT DOCUMENTS

| | | | |
|---|---|---|---|
| 249,665 | 11/1881 | Pettebone | 294/49 |
| 3,226,149 | 12/1965 | McJohnson | 294/49 |
| 4,050,728 | 9/1977 | Davidson | 294/58 |
| 4,103,954 | 8/1978 | Vaslas | 294/58 |

Primary Examiner—James B. Marbert
Attorney, Agent, or Firm—Thomas J. Ring

[57] ABSTRACT

An adjustable double handled shovel in which both handles are composed of grooved, telescopically mated sections for independent relative length adjustment and which are releasibly interconnected by a cross bar that both strengthens the handle assembly and permits adjustment of the relative angle between the two handles. Fasteners received with the grooves secure the mated sections together at the selected length. Adjustable handle grips are also releasibly secured to the ends of both handles by means of telescopic connectors and groove with fasteners for relative rotary movement relative to the handles. The blade portion of the shovel has a sharpened notched portion which engages and cuts obstructions while digging.

19 Claims, 1 Drawing Sheet

U.S. Patent
Nov. 29, 1988
4,787,661
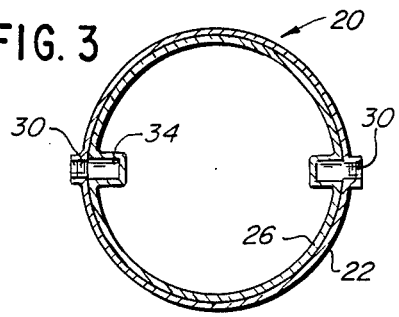
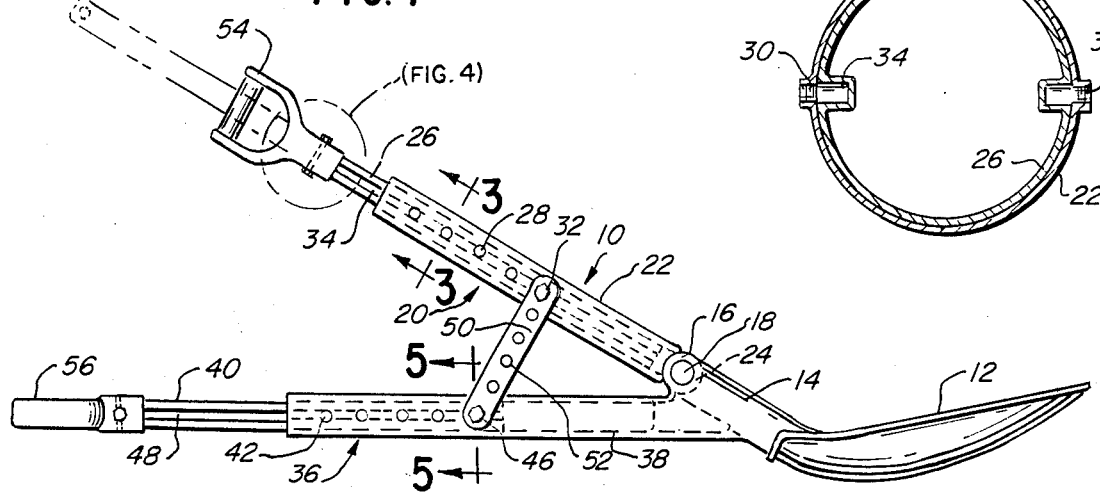
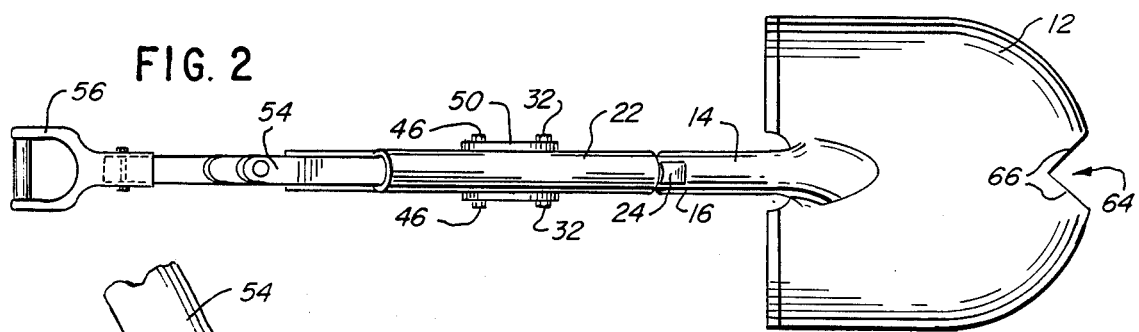
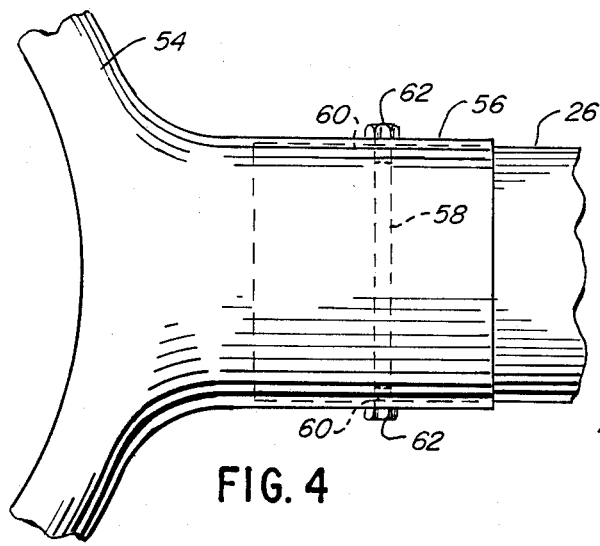
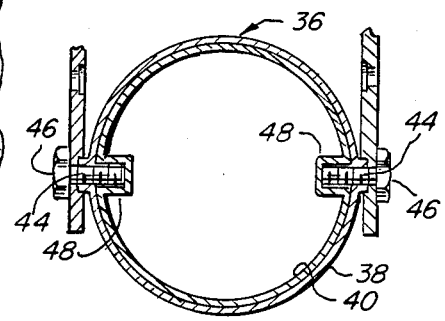
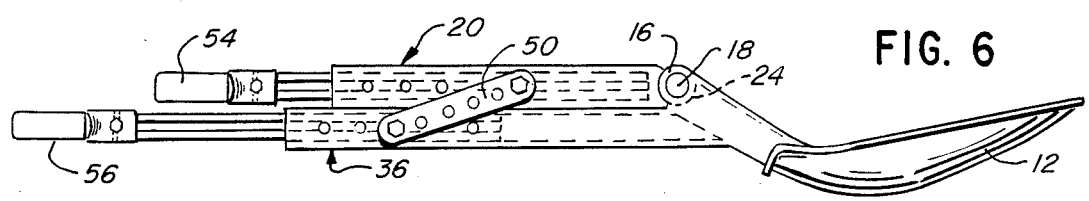

ADJUSTABLE DOUBLE HANDLED SHOVEL

BACKGROUND OF THE INVENTION

This invention relates to an improved shovel and, in particular, to an improved double handled shovel in which the handles are adjustable in handle length and in angular position relative to one another and to one in which a V-shaped notch is provided in the shovel blade to facilitate cutting operations.

Double handled shovels are well known In some of these devices a second handle is permitted to move freely in multiple directions such as shown in Bernett, U.S. Pat. No. 4,264,096, Apr. 28, 1981; Helton, U.S. Pat. No. 4,200,324, Apr. 29, 1980 and Davidson, U.S. Pat. No. 4,050,728, Sept. 27, 1977, while a second handle moves freely in only one plane in Vosbikian, U.S. Pat. No. 4,229,033, Oct. 21, 1980. There are other double handled shovels in which the second handles are secured at selected relative angular positions each as in Vaslas, U.S. Pat. No. 4,128,266, Dec. 5, 1978 and Vaslas, U.S. Pat. No. 4,103,954, Aug. 1, 1978. A double handled shovel is also known in which a second handle is adjustable in length as shown in Davidson, U.S. Pat. No. 4,050,728, Sept. 22, 1977.

While the known double handled shovels have advantages over single handled shovels because of their non-adjustability of both handles, they often cannot be employed to maximum advantage either because the height or strength of the laborer using the shovel is inappropriate for the overall shovel handle length of both handles or because a cramped job site does not permit optimum leverage unless both handles can be shortened or lengthened. In other cases, unrestrained movement of one of the handles deprives the handle of any leverage capability, while in others the lack of means for rigidly securing the handle together in a preselected angular position weakens the structural integrity of the shovel or precludes the use of both handles in a leverage action. In general, the known shovels are incapable of adjustment to optimum configurations for laborer size or strength, and job site space restrictions and cutting material It is well known that shoveling material with a manual implement is a strenuous activity which can exert stress on a person's lower back, cardiovascular system and other areas of the body. This exertion can be experienced in inserting the blade of the shovel into the material to be shoveled, working the blade through the material, lifting the material and also cutting through obstructions which may be located in the material, such as roots.

In order to reduce the amount of stress exerted on the laborers who use a double handled shovel, the device must have versatility in its configuration to provide optimum leverage, i.e., the angle between handles and the lengths of the handles, to adapt to varying work environments and varying heights of different laborers using the shovel. The user at different times may be located in confined work areas, such as a ditch or deep hole or may be located below, above or lateral to the material to be dug. A further factor can be the material to be extricated may vary in density and composition.

The configuration of the handles can alter the distance the user is from the material and his mechanical leverage he can exert on the material and thereby can decrease the exertion on different parts of the user's anatomy in inserting the shovel into the material as well as prying, lifting and cutting the material.

SUMMARY OF THE INVENTION

Accordingly, it is a principal object of the present invention to provide an improved shovel which can be optimally configured for various circumstances while maintaining the structural strength needed for optimum mechanical advantage.

The subject invention is a durable double handled shovel which can be formed and secured easily into different configurations of handle lengths and angular relationships between handles and thereby provide the user with the ability to adapt his shovel to various working environments in order to reduce stress on various parts of his body and optimize mechanical advantages while using the shovel.

A more particular aspect of this invention provides telescopically mated sections in each handle in which the inner section has a groove extending along the length of that section The mating outer section carries a fastener for removable receipt within the groove. This fastener blocks relative rotary movement between the mating sections and frictionally engages the groove to prevent relative sliding movement between the sections. This aspect permits the user to have virtually an infinite number of combinations of handle lengths that will maintain their position simply and securely.

Another aspect of this invention is to provide a securing device that will perform the dual functions of fixedly securing the preselected relative angle between handles and at the same time releasably securing the mating sections of at least one handle to a preselected handle length. This aspect permits the user to utilize one securement device to simply obtain the desired shovel configuration of handle length and relative angle between handles.

A further aspect of this invention is to provide a shovel having a blade with a notch having sharpened edges to engage and cut obstructions while digging.

BRIEF DESCRIPTION OF THE DRAWINGS

The foregoing advantages, objects and features of the invention will be described in more detail and other advantages and objects of the invention will become evident from the following detailed description of the preferred embodiment which is given with reference to the figures of the drawing, in which:

FIG. 1 is a side view of the double handled adjustable shovel of the invention which shows the adjustment of a handle in phantom line;

FIG. 2 is a top view of the double handled adjustable shovel of FIG. 1;

FIG. 3 is a sectional view taken along section line III—III in FIG. 1;

FIG. 4 is an enlarged view of the portion of the shovel encircled in FIG. 1;

FIG. 5 is a sectional view taken along the line V—V in FIG. 1; and

FIG. 6 is a side view of the fixedly adjustable double handled shovel when the handles are in a parallel, or collapsed, position.

DETAILED DESCRIPTION OF THE DRAWINGS

In FIG. 1 the fixedly adjustable double handled shovel is designated by general reference numeral 10. The blade 12 of shovel 10 is substantially planar and has a stem portion 14 attached to blade 12 and projecting outwardly therefrom.

Stem portion 14 has a hinge mounting member 16 for holding a hinge pin 18 substantially transverse to a first elongate adjustable handle 20. First elongate adjustable handle 20 comprises an outer elongate tubular section 22 that has a collar section 24 that receives hinge pin 18 thereby providing pivotal mounting of tubular section 22 to the stem portion 14.

An inner tubular section 26 telescopically fits with outer tubular section 22 permitting sliding movement therebetween. This construction permits first elongate adjustable handle 20 to be varied in overall length. The desired length can be releasably fixed. This is easily accomplished by providing apertures or passageways 28 in the outer tubular section 22. Apertures 28, as seen in FIG. 3, have threads 30 to permit a set screw 32 to be screwed into outer tubular section 22 and engage a longitudinal groove 34 disposed along the length of inner tubular section 26. Thus, when the desired length is reached by sliding outer section 22 relative to inner section 26, at least one set screw 28 is screwed into an aperture 28 of the outer tubular section 22 and enters groove 34 of inner tubular section 26. When set screw 32 is tightened, it prevents rotational movement of inner tubular section 26 and frictionally engages the lower portion of groove 34 and prevents longitudinal relative movement between inner and outer sections 26 and 22.

The construction of the second elongate adjustable handle 36 is similar to that described above for the first elongate adjustable handle 20. Outer tubular section 38 is fixedly attached to stem portion 14. Inner tubular section 40 telescopically fits in sliding relationship with outer tubular section 38. Apertures 42 are disposed along outer tubular section 38 which contain threads 44 to receive set screws 46, as seen in FIG. 5. Set screws 46 are screwed into threads 44 and are received in grooves 48 that are longitudinally disposed along inner tubular section 40. When set screw 46 is tightened into groove 48, relative rotational movement between inner and outer sections 40 and 38 are prevented. At the same time, set screw 46 frictionally engages the bottom portion of groove 48 and prevents relative longitudinal movement between inner and outer tubular sections 40 and 38.

Multiple apertures 28 and 42 are disposed along the lengths of outer tubular sections 22 and 38 respectively. This permits the user to utilize the proper aperture depending on the desired length of that particular handle and permits the user to use multiple sets of set screws if added securement is necessary to prevent migration of the inner tubular sections 26 and 40 along outer tubular sections 22 and 38, respectively, during use of the shovel.

A desired relative angle between elongate adjustable handles 20 and 36 can be obtained and then secured. A cross bar 50, as seen in FIG. 1, spans between elongate adjustable handles 20 and 36. Cross bar 50 is made of a rigid material and has multiple apertures 52 disposed along its length. Thus, when the user pivots the first elongate adjustable handle 20 to the desired angle relative to the second elongate adjustable handle 36, set screws 32 and 46 can be inserted into the desired aperture 52. Securement of the relative angle between handles is typically accomplished, as shown in FIG. 5, such set screws through the respective threads by screwing inserting set screws 32, as seen in FIG. 1, and 46 through an aperture 52 of cross bar 50 and then of the apertures found in both outer tubular sections 22 and 38. In the embodiment shown, the set screws 32 and 46 will engage the respective grooves 34 and 48 of inner tubular sections 26 and 40 to simultaneously secure the desired lengths of elongate adjustable handles 20 and 36 and their relative angular position. Should inner tubular sections 26 and 40 not be inserted far enough into outer tubular sections 22 and 38, respectively, to have their respective grooves 34 and 48 receive set screws 32 and 46, then the angular position will be secured by the set screws 32 and 46 engaging the threads of the apertures found in outer tubular sections 22 and 38, as previously described. Other set screws, in this instance would be needed to fix the lengths of the handles by engaging their respective grooves by utilizing other apertures 28 and 42.

Hand grips 54 and 56 are rotatable to a desired position as seen in the the phantom portion of grip 54 in FIG. 1, and then releasibly securable. Both hand grips 54 and 56 have the same construction which is shown in FIG. 4. Hand grip 54 has a collar portion 56 which telescopically mates with the end of inner tubular section 26. Inner tubular section 26 has a groove 58 disposed circumferentially around section 26. Collar section 56 has at least one threaded aperture 60 which threadingly receives set screw 62. The user can turn hand grip 54 to a desired rotational position relative to blade 12 and secure that position by screwing set screw 62 through threaded aperture 60 until it snuggly engages groove 58. When the set screw 62 is tightened, it will block telescopic movement between hand grip 54 and inner tubular section 26 as well as create sufficient frictional engagement with the bottom portion of groove 58 to prevent relative rotary movement between hand grip 54 and inner section 26.

In FIG. 6, the pair of handles 20 and 36 are secured in a side-by-side parallel relationship. This configuration is primarily utilized when there is no need for the use of two handles at the same time or for convenience in storing. This configuration is obtainable because the hinge mounting member 16 is spaced sufficiently above elongate handle 36. This permits hinge collar 24 to rotate about pin 18 until handles 20 and 36 are parallel and contiguous. It is important to note that cross bar 50 is secured in an orientation to not permit any portion of cross bar 50 to project above or below handles 20 and 36 to avoid a potentially hazardous projection to the user.

In FIG. 2, blade 12 has a cutting edge 63 having a V-shaped notch 64. Notch 64 is centrally disposed at the end of blade 12 and is substantially in alignment with stem portion 14 and hand grips 54 and 56 of handles 22 and 38 to maximize transfer of linear force from the handle of the shovel to the sharpened edges 66 of notch 64. Thus, when the user strikes an obstruction while digging such as, for example, a tree or plant root, notch 64 can engage that obstruction and sharpened edges 66 will facilitate cutting through the obstruction.

The user of this aforedescribed invention can simply adjust the length of at least one of the handles, pivot the handles in a plane substantially transverse to the blade to a desired angular position and then releasably secure the desired angular position.

It will be understood that the foregoing description of the preferred embodiment of the present invention is for purposes of illustration only, and that the various structural and operational features herein disclosed are susceptible to a number of modifications and changes, none of which entails any departure from the spirit and scope of the present invention, as defined in the hereto appended claims.

I claim:

1. A fixedly adjustable double handled shovel, comprising:
   a substantially planar blade;
   a pair of elongate, length adjustable handles; means for fixedly attaching one of the elongate, length adjustable handles to the blade;
   means for pivotally mounting another of said pair of length adjustable handles to the blade for angular movement relative to the one length adjustable handle only in a plane substantially transverse to that of the blade and in which part of said fixedly attaching means, said pivotally mounting means, part of the one handle fixedly attached to the blade and the blade comprises an integral piece of rigid material to which the remaining part of the one handle and the entire other elongate, length adjustable handle are removably attached; and
   angle securing means releasibly securing said first and second elongate, length adjustable handles at selected ones of relative angles therebetween.

2. The shovel of claim 1 in which each of said adjustable handles is composed of a pair of elongate handle sections which are telescopically fitted together for relative sliding movement to adjust the overall length of the adjustable handle formed thereby.

3. The shovel of claim 2 in which said pivotally mounting means includes means for pivotally mounting one of said sections to the blade by means of a hinge mounting member, said hinge mounting member being fixedly attached to the blade for holding a hinge pin in a plane substantially transverse to that of the handles.

4. The shovel of claim 3 in which said hinge mounting member includes a member for holding the hinge pin spaced from the elongate axis of the other of said pair of elongate, length adjustable handles to enable pivoting of the pair of handles to a parallel position relative to one another.

5. The shovel of claim 2 in which said fixedly attaching means includes means for fixedly attaching one of said handle sections of said one length adjustable handle to the blade.

6. The shovel of claim 1 in which each of said elongate, length adjustable handles has
   a hand grip,
   means for mounting the hand grip to an end of the handle for relative rotary movement around the elongate axis of the handle and
   means for releasibly securing the hand grips in different angular positions relative to the blade.

7. The shovel of claim 1 in which said angle securing means includes
   a rigid, elongate cross bar,
   means for mounting one part of the cross bar to one of the handles at a location along the length of the one handle spaced from the blade, and
   means for releasibly attaching another part of the cross bar to the other one of the pair of handles to hold it at a selected angular position relative to the one handle.

8. The shovel of claim 7 in which
   said fixedly attaching means includes means for pivotally attaching one end of the cross bar to one of the handles, and
   said releasible attaching means includes means for releasibly attaching an opposite end of the cross bar to the other one of the handles at different locations along its length corresponding to different relative angular portions of the pair of handles.

9. The shovel of claim 7 in which said releasible attaching means includes means for securing one of said handles to the cross bar at different locations along the length of the cross bar corresponding to different relative angular positions of the pair of handles.

10. An adjustable, doubled handled shovel, comprising:
    a blade;
    a first elongate handle;
    a second elongate handle of adjustable length having first and second handle sections mounted to one another for sliding movement relative to one another to different relative positions corresponding to different adjusted lengths;
    means for fixedly attaching one of said first and second handles to the blade;
    means for mounting the other of said first and second handles to the blade for pivotal movement to different angular positions relative to the one handle;
    adjustment securement means for performing the duel functions of fixedly securing the first and second sections of the second handle in a preselected relative position corresponding to a preselected adjusted length and for releasibly securing the first and second handles in a preselected relative angular position.

11. The adjustable, double handled shovel of claim 10 in which said adjustment securing means includes a cross bar and a fastener for attaching said cross bar to both of the sections at overlapping portions thereof.

12. The adjustable, double handled shovel of claim 11 in which said securing means includes
    a groove in one of said sections within which is received said fastener, and
    a passageway through said other section for receipt therethrough of the fastener, said fastener extending through said hole and bearing against said groove to block relative rotary movement between the sections while frictionally pressing against the groove to prevent relative sliding movement.

13. The adjustable, double handled shovel of claim 11 in which the fastener is a threaded fastener.

14. The adjustable, double handled shovel of claim 10 including a pair of hand grips respectively mounted to ends of said pair of handles for relative rotary movement to different selected angular positions relative to the blade.

15. The adjustable, double handled shovel of claim 14 in which each of said hand grips includes a member which telescopically mates with the end of the handle and includes a groove for receipt of a fastener attached to said handle, said fastener being in a blocking relationship with said groove to prevent telescopic separation of the grip from the handle while frictionally pressing against the groove to prevent relative rotary movement.

16. An adjustable, double handled shovel, comprising;
    a blade:
    a pair of elongate length adjustable handles mounted to the blade, each of said handles having a pair of telescopically mated sections, an inner one of said sections having a groove with a bottom and side walls extending along its length and its mating outer section and carrying a fastener for removable receipt within said groove, said fastener when in the grove engaging said side walls to block substantial relative rotary movement between the sections while frictionally engaging the bottom of the groove to prevent relative longitudinal sliding movement between the sections; and means for selectively adjusting angular position of one of said handles relative to the others.

17. The adjustable, double handled shovel of claim 16 including a pair of hand grips, and means for mounting said hand grips to the ends of said handles, respectively.

18. The adjustable, double handled shovel of claim 17 in which said hand grips mounting means includes a fastener carried by said handle and a curved groove with a bottom and side walls adjacent the end of the inner section for receipt of said fastener, said fastener, when held away from the bottom of the groove permitting rotary movement of the hand grip relative to the handle and blade while blocking axial separation of the handle from the section and releasibly holding the relative angular position of the handle and hand grip through frictional engagement of the fastener with the bottom of the groove.

19. A method of adjusting a shovel having two length adjustable handles and a substantial planar blade connected thereto comprising the steps of:

adjusting the length of one of said handles relative to the blade;

adjusting the length of the other of said handles relative to the adjusted position of the one blade;

pivoting one of said length adjusted handles in a plane substantially transverse to that of the blade to one of a plurality of selected desired angular positions relative to the other handle; and releasibly securing said one handle in said one desired position relative to the other handle.

* * * * *

UNITED STATES PATENT AND TRADEMARK OFFICE
CERTIFICATE OF CORRECTION

PATENT NO. : 4,787,661

DATED : November 29, 1988

INVENTOR(S) : Thomas G. Rutledge

It is certified that error appears in the above-identified patent and that said Letters Patent is hereby corrected as shown below:

Column 1, line 44, after "material" insert --.--;

Column 2, line 21, after "section" (first occurrence) insert -.-;

Column 3, line 22, change "28" to - 32 --.

Column 5, lines 8-10, make a separate sub-paragraph of the element "means for fixedly attaching one of the elongate, length adjustable handles to the blade;";

Column 6, line 26, delete "duel" and insert - dual -;

Column 7, line 4 delete "grove" and insert - groove -; and

Column 8, line 13, delete "adjusted position of the one".

Signed and Sealed this

Twentieth Day of June, 1989

*Attest:*

DONALD J. QUIGG

*Attesting Officer*     *Commissioner of Patents and Trademarks*